United States Patent [19]
Lewis et al.

[11] 3,747,811
[45] July 24, 1973

[54] AGITATOR FOR FACILITATING FLOW FROM HOPPER

[76] Inventors: Karl D. Lewis, Argonia, Kans.;
Ray W. Hasselwander, Pondcreek, Okla.; William Leon Ammann, Argonia, Kans.

[22] Filed: Jan. 25, 1971

[21] Appl. No.: 109,497

[52] U.S. Cl............... 222/233, 222/40 S, 214/44 R
[51] Int. Cl............................................. G01f 11/00
[58] Field of Search.................. 222/409, 200, 372, 222/233, 234, 235, 229, 291, 323, 324, 179.5, 180, 181, 245, 404, 199, 260, 185; 214/17 D, 44 R; 259/37, 38, 39, 47

[56] References Cited
UNITED STATES PATENTS

| | | | |
|---|---|---|---|
| 944,897 | 12/1909 | Morris | 222/409 X |
| 1,395,801 | 11/1921 | Corum | 222/409 X |
| 2,589,762 | 3/1952 | Barnett et al. | 222/200 X |
| 1,323,401 | 12/1919 | McCaskie | 222/409 X |
| 46,130 | 1/1865 | Myers | 222/199 |
| 2,694,509 | 11/1954 | Vita | 222/324 |

Primary Examiner—Samuel F. Coleman
Assistant Examiner—James M. Slattery
Attorney—William S. Dorman

[57] ABSTRACT

An agitating device adapted for being disposed on a container or hopper, such as the hopper of a railroad car, and having movable fingers or prong members extending upwardly through the hopper opening for stirring or agitating the material being discharged therethrough for facilitating the flow of material from the hopper, and particularly for facilitating the flow of granular bulk material therefrom.

7 Claims, 4 Drawing Figures

PATENTED JUL 24 1973

3,747,811

KARL D. LEWIS
RAY W. HASSELWANDER
WILLIAM LEON AMMANN
INVENTORS

BY

*William S. Dorman*
ATTORNEY 3,747,811

AGITATOR FOR FACILITATING FLOW FROM HOPPER

This invention relates to improvements in agitating devices and more particularly, but not by way of limitation, to an agitator for facilitating flow of material from a container or hopper.

The discharge of granular bulk materials from containers or hoppers, such as the hoppers on the bottom of a railroad car, or the like, creates certain problems in that the material may accumulate in relatively solid masses of a size too great for readily passing through the hopper opening. As a result, it is preferable to break up or agitate the granular material in some manner during the discharge thereof from the hopper to facilitate the flow of the material therefrom.

The present invention contemplates an agitating device for facilitating the flow of granular bulk material from a hopper or other container and is provided with a plurality of upright or outwardly extending prongs adapted to project through the opening of the hopper and into the material being discharged through the hopper for stirring the material flowing therefrom in a manner to substantially preclude accumulation thereof in masses too large for passage through the hopper opening. The prongs are mounted on a carriage member which is reciprocally disposed on a boom. The carriage member may be reciprocated in any suitable manner, such as by means of a chain and sprocket drive mechanism which may be actuated by a suitable hand operated power source, such as a hand drill motor, or the like, and the apparatus may be secured to the bottom of the hopper in order to position the prongs in substantial alignment with the hopper opening. The prongs may also be folded to an "out-of-the-way" position for facilitating installation of the apparatus on the hopper and during periods when the device is not in use. Of course, the boom itself may be reciprocated, if desired, for transmitting reciprocation to the prong members.

It is an important object of this invention to provide a novel apparatus for use with a container of bulk material to facilitating the flow of the granular bulk material therefrom.

Another object of this invention is to provide a novel agitator apparatus for stirring granular bulk material being discharged from a hopper to substantially preclude massing of the material at the hopper opening, or the like, for providing a substantially constant and uniform flow of the material from the hopper.

A further object of this invention is to provide a novel agitating device for facilitating the flow of material from a hopper or container and which may be actuated by a hand operated power motor or tool, or any other suitable means.

Still another object of this invention is to provide a novel agitator apparatus for facilitating the flow of material from a container which is particularly designed and constructed for ease of installation on the hopper.

A further object of this invention is to provide a novel agitator for facilitating the flow of material from a hopper, or the like, which is simple and efficient in operation and economical and durable in construction.

Other and further objects and advantageous features of the present invention will hereinafter more fully appear in connection with a detailed description of the drawings in which.

Figure 1:
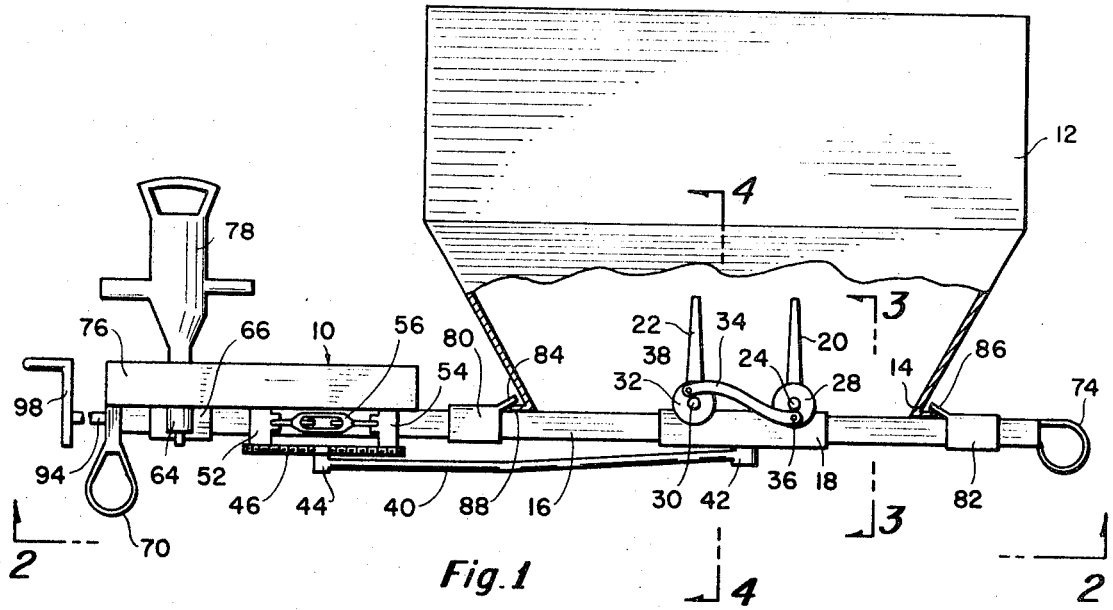
FIG. 1 is a side elevational view of an agitator apparatus embodying the invention and secured to the bottom of a hopper, with portions of the hopper depicted in section for purposes of illustration.

Referring to the drawings in detail, reference character 10 generally indicates an agitator device adapted to be secured to any suitable container of graular bulk material. As shown herein the container is a hopper 12 having an open bottom end 14 as is well known. The device 10 is secured in the proximity of the open end 14 in a manner as will be hereinafter set forth. The hopper 12 may be of any suitable type, such as that provided on the bottom of a railroad car (not shown) and is preferably provided with the usual hopper valve (not shown) therein for opening and closing the hopper 12 as is well known to discharge material from the open end 14.

Figure 3:
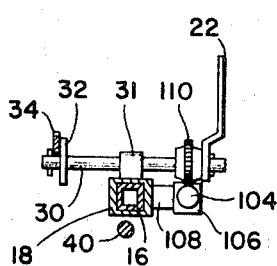
FIG. 3 is a view taken on line 3—3 of FIG. 1 with portions eliminated for purposes of illustration.

The agitator device 10 comprises a support boom or bar member 16 preferably constructed from square tubing, but not limited thereto, and having a carriage member 18 slidably disposed thereon. The carriage member 18 may be of any suitable configuration and as shown herein in of a substantially box-type configuration slidably receiving the boom 16 therethrough. A pair of spaced movable prong members 20 and 22 are secured to the carriage 18 and movable simultaneously therewith along the boom 16. The prong 20 is keyed or otherwise secured to one end of a rotatable shaft 24 which is supported on the carriage 18 by a suitable journal box or bearing member 36 (FIG. 3) which may be welded, bolted, or otherwise secured to the carriage 18. A cam or wheel 28 is keyed or otherwise secured to the opposite end of the shaft 24 and rotatable therewith for a purpose as will be hereinafter set forth.

Figure 4:
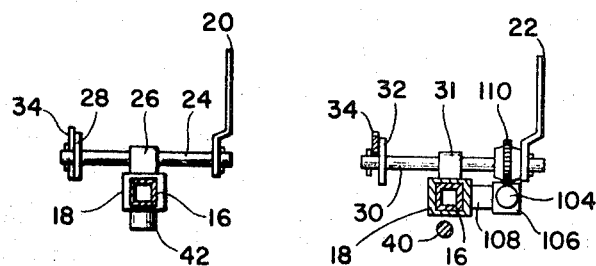
FIG. 4 is a view taken on line 4—4 of FIG. 1 with portions eliminated for purposes of illustration.

The prong 22 is substantially identical with the prong 20 and is secured to one end of a rotatable shaft 30 which is spaced from and preferably substantially parallel to the shaft 24. The shaft 30 is secured to the carriage 18 by a journal or bearing 31 (FIG. 4) in a manner similar to the shaft 24, and a cam or wheel 32 similar to the wheel 28 is secured to the opposite end of the shaft 30 for rotation simultaneously therewith. A lever arm 34 of a substantially reverse S-shape configuration is interposed between the wheels 28 and 32 and has the opposite ends thereof pivotally secured to the wheels 28 and 32 at 36 and 38, respectively, for a purpose as will be hereinafter set forth.

Figure 2:
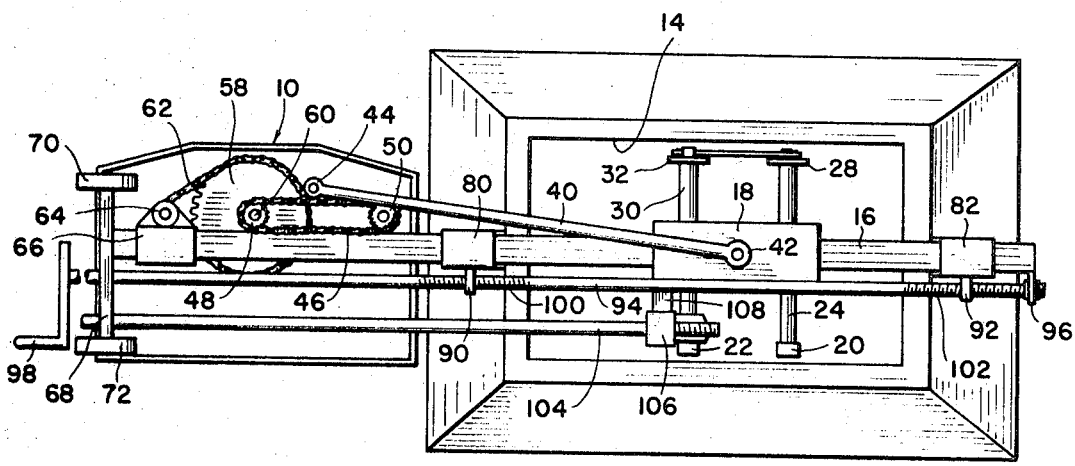
FIG. 2 is a view taken on line 2—2 of FIG. 1.

An actuator rod 40 has one end 42 thereof pivotally secured to the carriage 18 in any suitable manner and extends outwardly therefrom substantially adjacent the boom 16 as clearly shown in FIGS. 1 and 2. The opposite end 44 of the rod 40 is pivotally connected in any suitable manner with an endless chain 46 which extends between and around a pair of spaced sprocket members 48 and 50. The sprocket members 48 and 50 are supported in the usual manner by suitable journal boxes 52 and 54, or the like, which are suitably secured on the boom 16. The boxes 52 and 54 are spaced apart by a suitable turnbuckle means 56, as is well known, and the sprocket 48 is drivingly connected with a drive wheel 58 by a common rotatable shaft 60, or any suitable well known driving connection whereby the sprocket 48 is driven by the wheel 58. The drive wheel 58 is in turn connected with a prime sprocket (not shown) by an endless chain 62. The prime sprocket is rotatably supported by a pillow block bearing 64, or the like, which is suitably secured to the boom 16 by a box member or support 66. Of course, any suitable reciprocating drive mechanism, such as an air cylinder (not shown) or the like, may be suitably coupled to the actuator rod 40 for reciprocation thereof, if desired. In this instance the carriage 18 may be directly secured to the rod 40 rather than reciprocally secured thereto, if desired.

A bracket 68 is secured to the left end of the boom 16 as viewed in FIGS. 1 and 2 and is preferably provided with a pair of spaced loops 70 and 72 which provide handles for the unit 10. In addition, a similar loop 74 may be provided at the right end of the boom 16 to provide an additional handle for facilitating maneuvering of the unit 10. A housing 76 is secured to the boom 16 and bracket 68 in any suitable manner for encasing the drive wheel 58 and chain 62 connecting the wheel 58 with the prime sprocket. In addition, an aperture (not shown) is provided in the housing 76 in substantial alignment with the prime sprocket whereby the drive shaft (not shown) of a hand power motor or tool 78, such as a pneumatic drill motor, electric drill motor, hydraulic motor, or the like, may be inserted therethrough for engagement with the prime socket or with the rotatable shaft thereof for transmitting rotation to the prime socket and thence to the drive wheel 58.

When the tool 78 is actuated for rotating the prime sprocket and drive wheel 58, the sprocket 48 is rotated for moving the endless chain 46 around and between the sprockets 48 and 50. As the chain 46 moves, the end 44 of the rod 40 is moved simultaneously therewith and moves through an elongated substantially oval or elliptical path as determined by the size and relative configuration of the sprockets 48 and 50. In effect, the end 44 of the rod 40 is reciprocated, and transmits a reciprocal movement to the end 42 thereof for reciprocating the carriage 18 along the boom 16. As the carriage 18 is thus reciprocated, the prongs 20 and 22 move reciprocally simultaneously therewith for a purpose as will be hereinafter set forth.

A pair of blocks 80 and 82 are slidably disposed on the boom 16 and spaced on opposite sides of the carriage 18 for facilitating securing of the apparatus 10 to the opening 14 of the hopper 12. The blocks 80 and 82 are substantially identical, but oppositely disposed and are provided with an outwardly and angularly directed lip 84 and 86, respectively, extending in directions toward the hopper 12, as particularly shown in FIG. 1. The opening 14 of the hopper 12 is normally provided with an outwardly extending peripheral flange 88 and the lips 84 and 86 are adapted to engage the lip 14 for securing the apparatus 10 on the hopper 12 in a manner as will be hereinafter set forth. The blocks 80 and 82 are each provided with an outwardly extending boss 90 and 92, respectively. Each boss 90 and 92 is provided with a threaded aperture (not shown) therethrough for receiving a rod 94 which is spaced from and substantially parallel with the boom 16. One end of the rod 94 is suitably journalled to the boom 16 as shown at 96 in FIG. 2, and is suitably journalled to the bracket 68 in the proximity of the opposite end thereof whereby the rod 94 may be rotated about the longitudinal axis thereof. In addition, a removable handle 98 is provided for connection with one end of the rod 94 for rotation thereof. The rod 94 is provided with spaced oppositely threaded portions 100 and 102 in the proximity of the apertured bosses 90 and 92 whereby rotation of the rod 94 in one direction will cause the blocks 80 and 82 to move along the boom 16 in a direction toward each other and rotation of the rod 94 in an opposite direction will cause the blocks 80 and 82 to move in a direction away from each other.

When the apparatus 10 is to be installed on the hopper 12, the blocks 80 and 82 may be positioned on the boom 16 in such a manner as to be spaced on the opposite sides of the opening 14. The rod 94 may then be rotated by the handle 98 in the proper direction for moving the blocks 80 and 82 toward each other whereby the lips 84 and 86 will engage the flange 88, thus securing the apparatus 10 to the hopper 12. When it is desired to remove the unit 10 from the hopper 12, the handle 98 may be utilized for rotating the rod 94 in an opposite direction whereby the blocks 80 and 82 will move away from each other for disengaging the lips 84 and 86 from the flange 88.

As hereinbefore set forth, the shafts 24 and 30 are journalled on the carriage 18 for rotation about the respective longitudinal axes thereof and are tied together or interconnected by means of the linkage member 34 secured between the wheels 28 and 32. The prongs 20 and 22 are secured to the shafts 24 and 30, respectively, for movement simultaneously therewith as the shafts 24 andd 30 are rotated. One of the shafts, for example the shaft 30, is connected with a rod 104 in any suitable manner whereby rotation may be selectively transmitted to the shaft 30. The rod 104 is preferably spaced from the rod 94 and disposed substantially parallel thereto. One end of the rod 104 is secured to the carriage 18 as will be hereinafter set forth and the opposite end thereof is slidably secured to the bracket 68 in any well known manner (not shown) and extends therebeyond a sufficient distance to permit reciprocation of the rod 104 simultaneously with the carriage 18. (As depicted in FIGS. 1 and 2, the rods 104 and 94 are shortened or broken at the left hand ends thereof for purposes of illustration.) The rod 104 is connected with the carriage 18 and the shaft 30 whereby the movement of the carriage 18 and may be manipulated for transmitting rotation to the shaft 30. Whereas this may be accomplished in any desirable manner, as depicted herein and shown in FIG. 4 the rod 104 extends rotatably through a sleeve or housing 106 which is secured to the carriage 18 by a suitable support member 108. A gear or sprocket member 110 is secured to the shaft 30 for simultaneously rotating therewith, and extends into engagement with the rod 104, which is suitably threaded in the proximity thereof for transmitting rotation to the gear 110 upon rotation of the rod 104 in the manner of a worm and gear system. The handle 98 may be removed from the rod 94 and connected with the rod 104 when it is desired to transmit rotation to the shaft 30.

It will be apparent that rotation of the rod 104 in one direction will rotate the gear 110 and shaft 30 in one direction and the rotation of the shaft 30 will be transmitted to the shaft 24 through the connecting link 34 whereby the shaft 24 will be simultaneously rotated, but rotated in an opposite direction from the shaft 30. Thus, rotation of the rod 104 in one direction will cause the shafts 24 and 30 be rotate in simultaneous opposite directions for pivoting the prongs 20 and 22 into a position substantially parallel to the boom 16, and thus to an "out-of-the-way" position. Rotation of the rod 104 in an opposite direction will cause the shafts 24 and 30 to rotate in simultaneous opposite directions for pivoting the prongs 20 and 22 to an extended position substantially perpendicular to the boom 16 whereby they extend through the opening 14 of the hopper 12. It will be apparent that suitable stop members (not shown) may be provided for limiting the rotation of the wheels 28 and 34 in both directions whereby the prongs 20 and 22 will be moved to a full extended or upright position upon one direction of rotation and to a full folded position upon rotation in an opposite direction. It is to be noted that a double gear box may be used in lieu of the linkage arrangement shown herein for raising and lowering of the prongs 20 and 22.

When it is desired to utilize the agitator apparatus 10 for facilitating the flow of granular bulk material, or the like, from the hopper 12 the apparatus 10 may be secured to the opening 14 thereof as hereinbefore set forth. By way of example, the hopper 14 may be provided on the bottom of a railroad car (not shown) and discharge material onto a conveyor belt, or the like (not shown). The usual hopper valve (not shown) may be opened for discharging the material from the hopper through the opening 14. The rod 104 is positioned whereby the prongs 20 and 22 extend upwardly through the Hopper opening 14 as shown in FIG. 1 and the hand operated motor 78, or other similar type power drill motor or apparatus, may be inserted into driving connection with the prime sprocket for rotating the drive wheel 58. As the wheel 58 is rotated, the sprockets 48 and 50 and chain 46 transmit reciprocal movement to the carriage 18 and prongs 20 and 22 for efficiently stirring or agitating the material being discharged through the opening 14.

When the flow of material from the hopper 12 ceases or is stopped for any reason, the motor 78 may be removed from connection with the prime sprocket, or the operation of the motor may be stopped for interrupting the reciprocation of the prongs 20 and 22. The rod 104 may be rotated in the proper direction for folding the prongs 20 and 22 into the "out-of-the-way" position thereof, if desired, and the apparatus 10 may either remain in position on the hopper 12, or may be removed therefrom. If the unit 10 is to be removed from the hopper 12, the rod 94 may be rotated in the proper direction for moving the blocks 80 and 82 in a direction away from each other for releasing the engagement between the lips 84 and 86 and the flange 88. The unit 10 may then be readily removed from the hopper 12 and transported to the site of another hopper, or for storage, as desired.

It will be apparent that whereas the wheels 28 and 32 as depicted herein are disposed on the opposite ends of the shafts 24 and 30 with respect to the prongs 20 and 22, the wheels 28 and 32 may be disposed adjacent to or in the proximity of the prongs 20 and 22, if desired. In addition, whereas the rod 104 is described herein as being a rotatable member having a threaded portion thereon for engagement with the spur or gear 110, a rack and pinion arrangement may be provided in lieu thereof to accomplish the rotation of the shaft 30 or the rod 104 may be pivotally secured to the member 110, which may or may not be a gear member in this instance, and reciprocation of the rod 104 would result in an oscillation of the member 110 for transmitting the desired rotation to the shaft 30 for lowering or raising of the prongs 20 and 22. There is no intention of limiting the invention to the exact arrangement of elements shown herein.

From the foregoing it will be apparent that the present invention contemplates a novel agitating device for facilitating the flow of material, and particularly granular bulk material, from a hopper, such as the hopper on the bottom of a railroad car. The device provides a plurality of prongs or finger members adapted to extend through and into the opening of the hopper and are reciprocal in the opening of the hopper for stirring the material being discharged therefrom to substantially preclude massing of the material and clogging of the hopper opening. A hand type drill motor or the like may be utilized for providing the motive power for operation of the unit. The novel apparatus is simple and efficient in operation and economical and durable in construction.

Whereas the present invention has been described in particular relation to the drawings attached hereto, it should be understood that other and further modifications, apart from those shown or suggested herein, may be made within the spirit and scope of this invention.

What is claimed is:

1. An agitating device for facilitating flow of material from the opening of a container and comprising support boom means, connecting means carried by the boom means for securing the device to the container, carriage means carried by the boom, prong means carried by the carriage means for extending into the container opening, reciprocating means engagable with the boom means for reciprocation of the carriage means and prong means to agitate the material during discharge thereof from the container, said reciprocating means comprising drive means secured to the boom means and connected with the carriage means for providing said reciprocation, and power means selectively engagable with the drive means for actuation thereof, and said drive means includes sprocket and chain means secured to the boom means, and lever means connected between the chain means and the carriage means for transmitting reciprocation to the carriage means upon actuation of the sprocket and chain means.

2. An agitating device as set forth in claim 1 wherein the sprocket and chain means comprises a first drive sprocket and chain means driven by the power means, and a second sprocket and chain means connected with the first sprocket and chain means for actuation thereby.

3. An agitating device for facilitating flow of material from the opening of a container and comprising support boom means, connecting means carried by the boom means for securing the device to the container, carriage means carried by the boom, prong means carried by the carriage means for extending into the container opening, reciprocating means engagable with the boom means for reciprocation of the carriage means and prong means to agitate the material during discharge thereof from the container, said connecting means comprising a plurality of spaced block members slidably secured to the boom means, and means connected between the boom means and block members for moving the block members along the boom means in opposite directions for selective connection with and disconnection from the container.

4. An agitating device for facilitating flow of material from the opening of a container and comprising support boom means, connecting means carried by the boom means for securing the device to the container, carriage means carried by the boom, prong means carried by the carriage means for extending into the container opening, reciprocating means engagable with the boom means for reciprocation of the carriage means and prong means to agitate the material during discharge thereof from the container, said drive means comprising a first chain and sprocket means secured to the boom and driven by the power means, second chain and sprocket means secured to the boom and in driving engagement with the first chain and sprocket means for actuation thereby, a lever arm having one end pivotally secured to the chain of the second chain and sprocket means and the opposite end pivotally secured to the carriage means, said lever being reciprocated upon actuation of the second chain and sprocket means for transmitting reciprocal movement to the carriage means.

5. An agitating device for facilitating flow of material from the opening of a container and comprising support boom means, connecting means carried by the boom means for securing the device to the container, carriage means carried by the boom, prong means carried by the carriage means for extending into the container opening, reciprocating means engagable with the boom means for reciprocation of the carriage means and prong means to agitate the material during discharge thereof from the container, said prong means comprising a plurality of spaced shaft members journalled on the carriage means, a prong member secured to each shaft member for pivotal movement simultaneously with the rotation of the respective shaft, means interconnecting the shaft members for simultaneous but opposite rotation therebetween, and means connected with at least one of the shaft members for transmitting rotation thereto for selectively moving the prong members to alternate folded and extended positions.

6. An agitating device for facilitating flow of material from the opening of a container and comprises an elongated support boom arm extending across the opening, spaced block members adjustably secured to the boom arm for connecting the device to the container, a carriage member slidably secured to the boom arm, prong means pivotally secured to the carriage member and movable to alternate folded and extended positions, said prong means extending into the container opening in the extended position thereof, and reciprocating means engagable with the boom arm means for reciprocation of the carriage member and prong means to agitate the material during discharge thereof from the container.

7. An agitating device as set forth in claim 11 including adjustable means for said spaced block members comprising threaded rod means extending substantially parallel with and spaced from the boom arm, threaded means carried by the block members for receiving the threaded rod therethrough, means supporting said threaded rod means for rotation and precluding longitudinal movement of the rod, means for transmitting rotation to the threaded rod means whereby said block members are simultaneously moved along said boom arm in opposite directions for selective spacing therebetween to facilitate connection of the device with the container.

* * * * *